United States Patent [19]
Orino et al.

[11] Patent Number: 5,627,669
[45] Date of Patent: May 6, 1997

[54] OPTICAL TRANSMITTER-RECEIVER

[75] Inventors: Kanjo Orino, Kawasaki; Tetsuo Sakanaka, Sagamihara; Yasusaburo Degura, Urawa; Takehide Hamuro, Yokohama, all of Japan

[73] Assignee: Canon Kabushiki Kaisha, Tokyo, Japan

[21] Appl. No.: 975,018

[22] Filed: Nov. 12, 1992

[30] Foreign Application Priority Data

Nov. 13, 1991 [JP] Japan .................................. 3-297187
Nov. 13, 1991 [JP] Japan .................................. 3-297188
Nov. 13, 1991 [JP] Japan .................................. 3-297193

[51] Int. Cl.$^6$ ................................................ H04B 10/00
[52] U.S. Cl. ........................ 359/156; 359/159; 359/172
[58] Field of Search ................................ 359/129, 131, 359/152, 153, 156, 159, 172

[56] References Cited

U.S. PATENT DOCUMENTS

| | | | |
|---|---|---|---|
| 3,813,553 | 5/1974 | Grossman | 359/170 |
| 4,867,560 | 9/1989 | Kunitsugu | 359/172 |
| 4,888,816 | 12/1989 | Sica, Jr. | 359/152 |
| 4,923,291 | 5/1990 | Edagawa et al. | 350/389 |
| 5,065,455 | 11/1991 | Ito et al. | 359/159 |
| 5,142,400 | 8/1992 | Solinsky | 359/170 |
| 5,347,387 | 9/1994 | Rice | 359/159 |

FOREIGN PATENT DOCUMENTS

| | | |
|---|---|---|
| 63-120534 | 5/1988 | Japan . |
| 1226228 | 9/1989 | Japan . |
| 2186311 | 7/1990 | Japan . |

Primary Examiner—Wellington Chin
Assistant Examiner—Rafael Bacares
Attorney, Agent, or Firm—Fitzpatrick, Cella, Harper & Scinto

[57] ABSTRACT

This specification discloses a communication apparatus provided with light emitting means for generating transmission light modulated by an information signal, light receiving means for receiving modulated reception light, an optical member for reflecting one of the transmission light and the reception light and transmitting the other therethrough, a reflecting member for reflecting the transmission light emerging from the optical member to the transmission side and reflecting the reception light to the optical member, light splitting means for splitting part of the reception light obtained through the optical member, detecting means for detecting the positional state of the light obtained from the light splitting means, and driving means for rotatively driving the reflecting member about two axes in accordance with the positional state of the light detected by the detecting means. The specification further discloses an apparatus which has a lens unit having positive refractive power disposed between the light emitting means and the light splitting means and in which at least one lens constituting the lens unit is moved to thereby vary the state of the light beam.

6 Claims, 14 Drawing Sheets

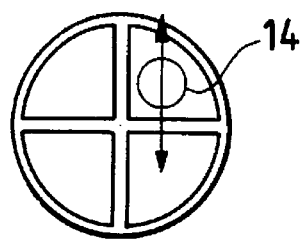
FIG. 3
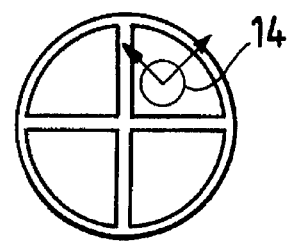
FIG. 4
FIG. 5
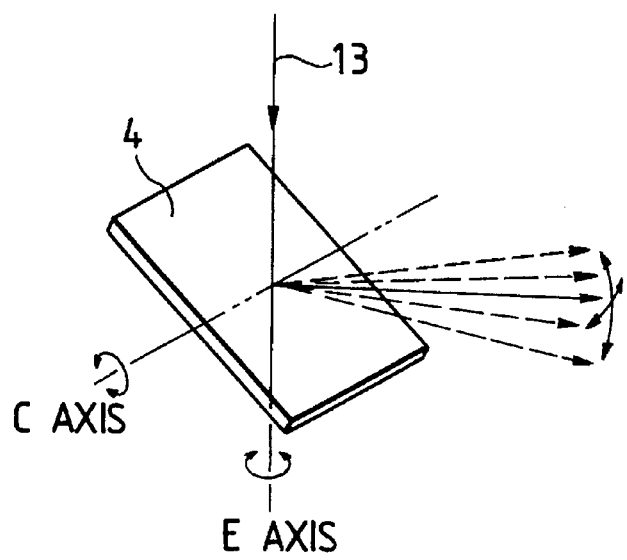
FIG. 6
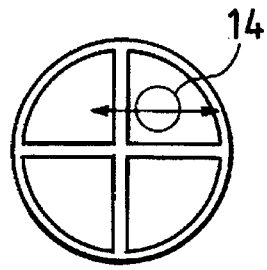

|  | FOCAL LENGTH | F NUMBER |
|---|---|---|
| TRANSMISSION OPTIC SYSTEM | 140mm | 1.4 |
| RECEIVING OPTIC SYSTEM | 100mm | 1 |
| CONVERGENCE OPTIC SYSTEM 74 | 35mm | |
| CONVERGENCE OPTIC SYSTEM 75 | 25mm | |
| DIVERGENCE OPTIC SYSTEM 76 | 40mm | |
| CONVERGENCE OPTIC SYSTEM 77 | 160mm | |

| DISTANCE BETWEEN PRINCIPAL POINTS 76 AND 76 |
|---|
| 120mm |

OPTICAL TRANSMITTER-RECEIVER

BACKGROUND OF THE INVENTION

1. Field of the Invention

This invention relates to a two-way spatial optical communication apparatus utilizing space as a transmission path to transmit and receive signals with a light beam as a medium, and particularly to an apparatus provided with an optical axis deviation correcting function.

2. Related Background Art

Recently, attention has been paid to a so-called spatial optical communication apparatus which effects information transmission by transmitting and receiving a modulated light beam through free space.

When light beam communication is to be effected in two ways, as shown in FIG. 13 of the accompanying drawings, a beam of light signal is sent from a transmitter and receiver 20 to the partner apparatus, but the partner apparatus must be confined within the light beam, and the partner apparatus receives that beam and receives the light signal, whereby communication can be accomplished.

A light beam, even after angular adjustment has once been effected, may have its angle varied by vibration, wind pressure, distortion by solar radiation, refraction by the temperature distribution of the atmosphere or the like and may deviate from the partner apparatus. Accordingly, means becomes necessary for detecting and adjusting the position of the beam during the position adjustment at the time of installation and during the operation of the apparatus.

As a method of detecting the position of a beam, a method of disposing a plurality of receiving lenses 21 around a transmitting lens 22 as shown in FIG. 14 of the accompanying drawings, and detecting the deviation of a received beam from the center by the distribution of quantities of light entering the respective receiving lenses is proposed in Japanese Laid-Open Patent Application No. 1-226228. Also, in a system wherein a receiving lens and a transmitting lens can be used in common, there is a case where a plurality of lenses exclusively for detecting the position of a beam are disposed around a main lens. In this case, the form becomes similar to that shown in FIG. 14, and there is sometimes used jointly a system in which besides a main signal transmitted, position detecting auxiliary signals (also called pilot signals) are transmitted while being superposed one upon another.

The deviation of the beam at the receiving point is due to the deviation of the transmission angle of the partner apparatus and therefore, to correct the deviation of the beam, it is necessary to send that information back to the partner apparatus. Popular means therefor is to direct the entire apparatus by the use of a system in which signals indicative of the position of a beam are transmitted while being multiplexed upon a main signal or a system which utilizes other circuit such as telephone or radio.

On the other hand, Japanese Laid-Open Patent Application No. 2-186311 discloses an apparatus in which a movable mirror is provided in the optical path of a light beam to thereby correct the deviation of the optical axis. This example of the prior art is shown in FIG. 12 of the accompanying drawings. According to this apparatus, provision is made of a mechanism 108 in which two mirrors are provided in the transmission optical path to thereby correct optical axes in two directions independently of each other, and a mechanism 107 in which two mirrors are further provided in the coaxial transmission and reception optical paths to thereby correct optical axes in two directions independently of each other, thereby correcting the angle.

In case of the former system, it is necessary to send the position information of the reception light beam back to the partner apparatus, and for that purpose, there becomes necessary on the side which transmits the position information a circuit for converting the position signal into a multiplexable form (digitalizing it, changing it into a serial signal, adding a synchronizing signal or the like thereto, and further modulating the same) and a circuit for multiplexing the position signal, and on the side which receives the position signal, there becomes necessary a circuit for effecting the converse processing. Therefore, the construction of the apparatus becomes complicated and costly. Also, the multiplexing of the position information signal leads to the problem that the transmission power for the main signal becomes correspondingly small. Also, where other circuit such as telephone is utilized to transmit the position signal, circuits for signal conversion, the control of transmission procedure, etc. are necessary on both sides, and this similarly leads to high costs and further, extra cost such as circuit fees will be required. Also, besides the problem in the transmission of the beam position information, beam position detecting means itself requires a number of optical systems as can be seen from FIG. 7 of the accompanying drawings, thus causing the bulkiness and high cost of the apparatus.

On the other hand, where use is made of optical axis deviation correcting means like the latter, at least four mirrors in total become necessary and a considerably long extension of the optical path becomes necessary, while there is the disadvantage that the cumulation of the deviation of the light beam by the change in the angles of the mirrors is great and this leads to the bulkiness of the apparatus or the inability to secure the range of corrected angle very widely. Also, when the optical axis of the received light is to be corrected, the optical axis of the transmitted light is changed at the same time, and this correction also becomes necessary. Accordingly, a complicated control signal processing circuit becomes necessary to effect the quick correction of the optical axes of the transmitted and received lights, and this leads to increased costs.

On the other hand, Japanese Laid-Open Patent Application No. 63-120534 discloses a technique of varying the directional angle of an emergent beam so that light may be reliably transmitted to the reception side apparatus. That is, as shown in FIG. 9 of the accompanying drawings, a laser source 103 is moved to thereby vary the directional angle.

Now, where in a prior-art apparatus as shown in FIG. 26 of the accompanying drawings, a laser diode is used as a light source 103, a cooling apparatus usually becomes necessary, and a light source mounting bed 104 must be moved with this cooling apparatus. In this case, there has been the disadvantage that a load is applied to a movable knob and it is difficult to make the light source 103 rectilinearly movable with good accuracy and the light source is liable to cause an oscillated state and even the direction of emergence of the center of light emission of the transmitted beam is liable to change.

On the other hand, it is also conceivable to change the directional angle of the transmitted beam by moving a lens unit 77 having positive power which constitutes a beam expander as shown in FIG. 18 of the accompanying drawings along the optical axis, but since the optical path from a reference state is changed on the transmission side and the reception side, the amount of movement of the focus of the reception light on the light receiving element side is amplified. Accordingly, the amount of variation in the spot diameter of the reception light beam on the light receiving surface tends to become great, and when the communication distance is a short distance, the amount of blur is great and the quantity of received light becomes deficient, and this has led to the disadvantage that the directional angle of the transmission beam cannot be sufficiently widened.

SUMMARY OF THE INVENTION

It is a first object of the present invention to provide an apparatus for transmitting and receiving a light beam modulated by an information signal in which said light beam is adjusted to thereby effect optical communication always in a good state.

It is a second object of the present invention to provide a spatial optical communication apparatus of which the deviation of the optical axis by the vibration of the earth, wind or the thermal distortion of the installation place with time is corrected and which achieves compactness and yet enables two-way communication of high reliability to be accomplished.

According to a preferred embodiment of the present invention, the apparatus is provided with light emitting means for generating a transmission light modulated by an information signal, light receiving means for receiving modulated reception light, an optical member for reflecting one of said transmission light and said reception light and transmitting the other therethrough, a reflecting member for reflecting the reception light emerging from said optical member toward the transmission side and reflecting the reception light toward said optical member, light splitting means for splitting part of the reception light obtained through said optical member, detecting means for detecting the positional state of the light obtained from said light splitting means, and driving means for rotatively driving said reflecting member about two axes in accordance with the positional state of the light detected by said detecting means. A lens unit having positive refractive power is further disposed between said light emitting means and said light splitting means, and at least one lens constituting said lens unit is moved to thereby vary the state of the light beam.

BRIEF DESCRIPTION OF THE DRAWINGS

FIG. 3 shows the movement of a light beam when the angle of the mirror is varied.

FIG. 4 shows the movement of the light beam when the angle of the mirror is varied.

FIG. 5 shows another mirror angle varying mechanism according to the present invention.

FIG. 6 shows the movement of the light beam when the mirror is rotated about the E axis of FIG. 5.

DESCRIPTION OF THE PREFERRED EMBODIMENTS

Figure 1:
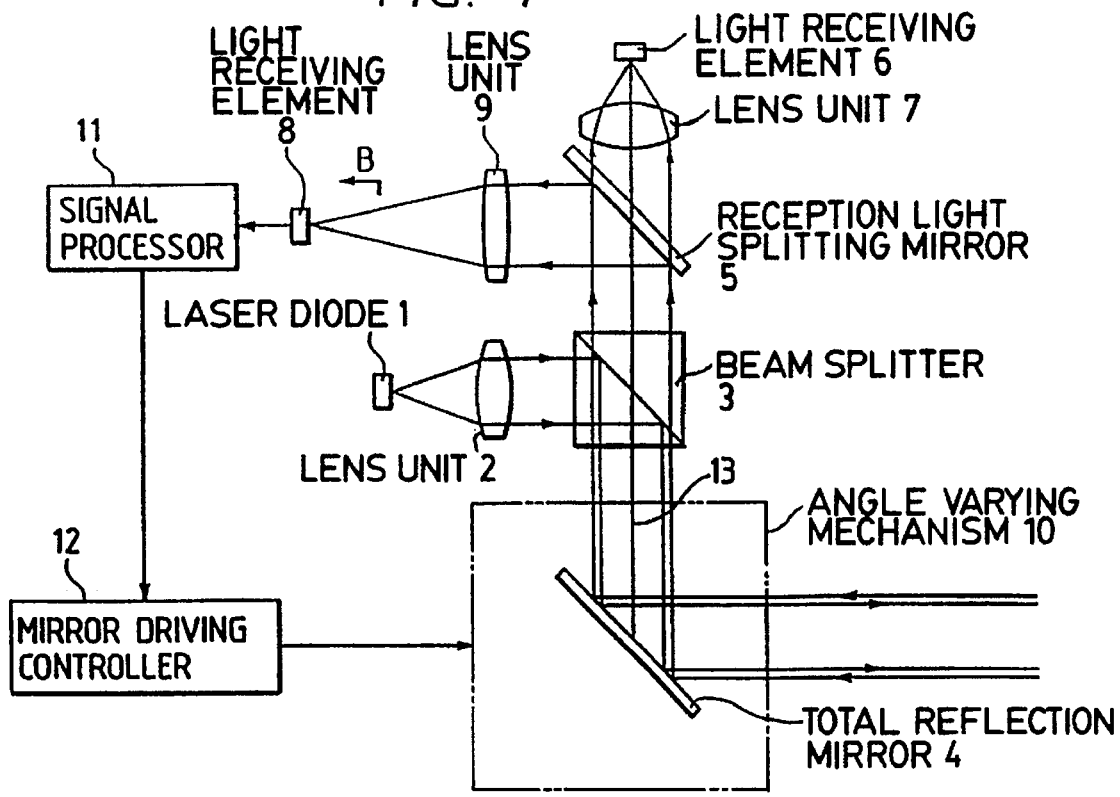
FIG. 1 is a schematic view of a first embodiment of an optical communication apparatus according to the present invention.

FIG. 1 is a schematic view of a first embodiment of the present invention. A laser diode 1 is used as a light emitting element, and modulated light is transmitted therefrom to a partner apparatus, not shown, through a lens unit 2 having positive power for substantially collimating the light beam, a polarizing beam splitter 3 and a total reflection mirror 4. On the other hand, the reception side is comprised of the total reflection mirror 4, the polarizing beam splitter 3, a reception light splitting mirror 5 (e.g. reflecting 10% and transmitting 90% therethrough), a light signal detecting light receiving element 6, a lens unit 7 having positive power for condensing part (90%) of the reception light on the light signal detecting light receiving element 6, a position detecting light receiving element 8 (e.g. a four-division sensor), and a lens unit 9 having positive power for condensing the remainder (10%) of the reception light on the position detecting light receiving element 8. The reflecting mirror 4 (tracking mirror) is provided with a mirror angle varying mechanism 10 to be described which can be rotated about two axes (as shown, for example, in FIG. 2, C axis orthogonal to the polarizing beam splitter side optical axis 13 at a point whereat the optical axis intersects the mirror and lying in the reflecting surface of the mirror and D axis orthogonal thereto). There are further prepared a signal processor 11 for producing an optical axis deviation correcting signal to a mirror driving controller on the basis of the output signal of the position detecting light receiving element 8, and a mirror driving controller for sending a driving signal to the driving portion of the mirror angle varying mechanism 10 on the basis of said correcting signal.

The laser beam introduced from the laser diode 1 into the lens unit 2 having positive power is modulated by an information signal, and this laser beam is substantially linearly polarized light of a polarization ratio of about 100:1 to 500:1 and is particularly polarized in a direction perpendicular to the plane of the drawing sheet of FIG. 1. The transmission light assumes a positional relation in which the direction of polarization thereof is parallel to the cemented surface of the polarizing beam splitter 3, that is, becomes so-called S-polarized light, and almost all (about 99%) of the laser beam is reflected by the cemented surface. On the other hand, the reception light is P-polarized light orthogonal to it, and multilayer thin film which will transmit almost all (about 96%) of the reception light therethrough is deposited by evaporation on the cemented surface. The beam splitter side optical axis 13 shown in FIG. 1 forms an angle of 45° with respect to the vertical direction so that when transmission and reception are effected with a transmitter and a receiver of the same structure opposed to each other, the directions of polarization of the two may be orthogonal to each other in the polarizing beam splitter.

When an attempt is made to effect communication of large capacity which can be widened in band and can accomplish high-speed response, a small element whose effective light receiving area is of a diameter of the order of 1 mm, such as an avalanche photodiode, is used as the light signal detecting light receiving element 6. It is necessary to enable the transmission beam to irradiate the partner apparatus within a receivable strength distribution and to prevent the reception beam from the partner apparatus from deviating from the effective light receiving area of the light signal detecting light receiving element 6 when the center of the laser beam spot has come to the center of the area of the position detecting light receiving element 8. Therefore, at the stage of assembly of the apparatus, the light signal detecting light receiving element 6 and the position detecting light receiving element 8 have their positional deviation adjusted at the order of micron with respect to the optical axis of the transmission light.

Figure 2:
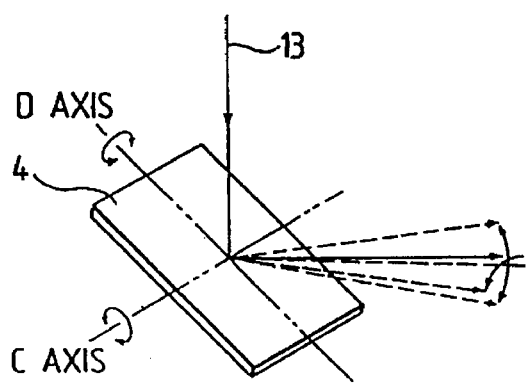
FIG. 2 shows the mirror angle varying mechanism of the optical communication apparatus according to the present invention.
Figure 13:
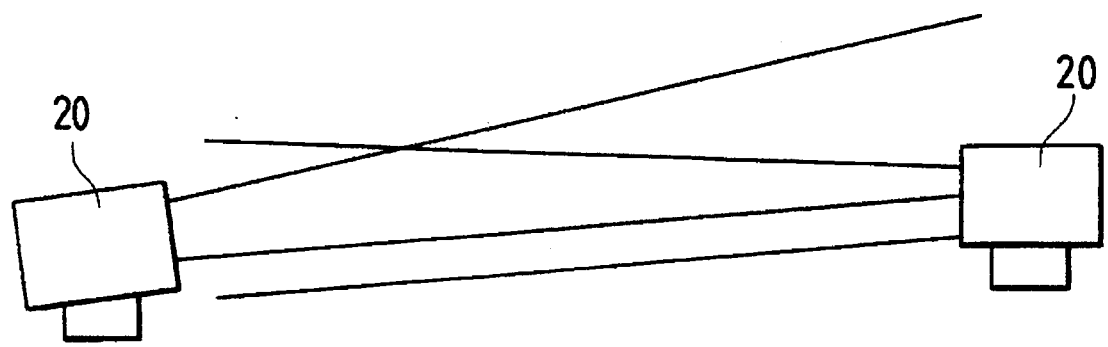
FIG. 13 shows the state of the angular deviation of the optical communication apparatus.
Figure 14:
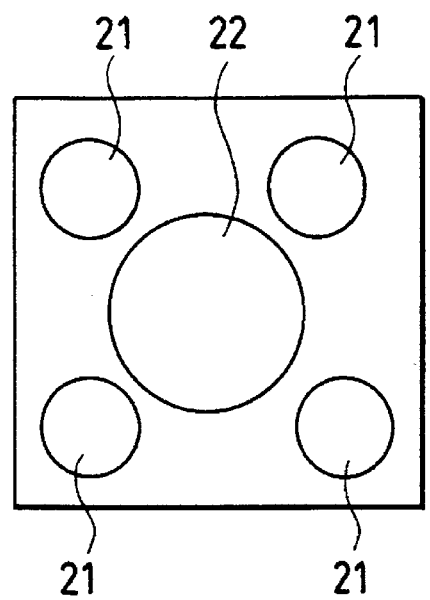
FIG. 14 shows a prior-art device for correcting angular deviation.

The positional deviation information of the reception beam spot on the light receiving surface of the position detecting light receiving element 8 is sent as an optical axis deviation correcting signal through the signal processor 11 to the mirror driving controller 12, from which a mirror driving signal is sent to the driving portion of the mirror angle varying mechanism 10. The motor of the driving portion is rotated or an actuator which will be described later is actuated on the basis of the thus sent signal, whereby the total reflection mirror 4 is rotated about the C axis and the D axis as shown in FIG. 2. The movement of the beam spot on the light receiving surface of the position detecting light receiving element 8 at this time is shown in FIGS. 3 and 4 (views seen from the direction B of the position detecting light receiving element 8 in FIG. 1). The rotation of the mirror about the C axis causes the beam spot 14 to move vertically on the light receiving surface as indicated by arrow in FIG. 13. The rotation of the mirror about the D axis causes the beam spot 14 to move rightwardly upwardly or leftwardly upwardly at an angle of 45° on the light receiving surface as indicated by arrows in FIG. 4. The operation of moving the beam spot 14 in the two different directions like this is repeated, whereby the reflecting mirror is controlled so that the center of the beam spot 14 may be located near the center of the light receiving surface of the position detecting light receiving element 8. Also, if the rotation of the mirror about an E axis coinciding with the beam splitter side optical axis 13 as shown in FIG. 5, instead of the rotation of the mirror about the D axis shown in FIG. 2, and the rotation of the mirror about the C axis are combined together, the beam spot can be moved more efficiently and control of better responsiveness can be accomplished because the movement of the beam spot 14 on the light receiving surface of the position detecting light receiving element 8 by the rotation of the mirror about the E axis is orthogonal to the movement of the beam spot 14 by the rotation of the mirror about the C axis shown in FIG. 3, as indicated by arrow in FIG. 6.

Figure 15A:
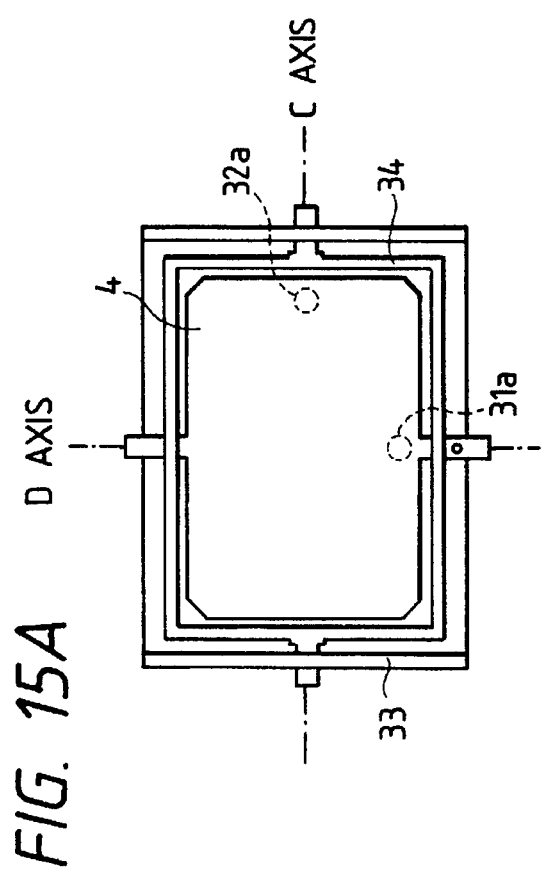
FIGS. 15A to 15C show the specific construction of a mirror according to the present invention.
Figure 15B:
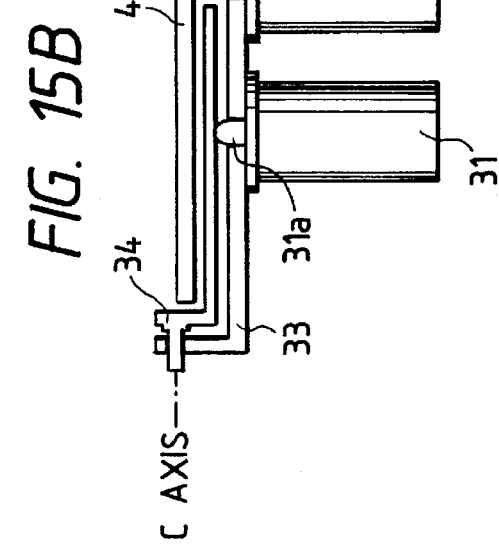
Figure 15C:
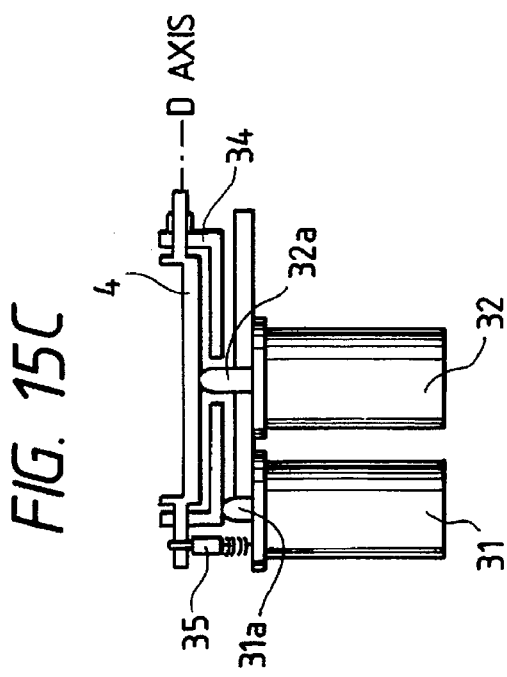

Here, the construction of the mirror angle varying mechanism 10 is shown in FIG. 15. The reference numerals 31 and 32 designate linear actuator bodies for rotating the mirror 4 about the C axis and the D axis by the actuating portions 31a and 32a thereof expanding and contracting. FIG. 15A is a front view, FIG. 15B is a side view of the mirror angle varying mechanism as it is seen from the direction of the D axis, and FIG. 15C is a side view thereof as it is seen from the C axis. Also, in FIG. 15A, dotted circles indicate the positions of the actuating portions 31a and 32a. The reference numeral 34 denotes a holding plate supporting the mirror 4 about the D axis, and the reference numeral 33 designates a holding plate supporting the holding plate 34 about the C axis. The reference numeral 35 denotes a spring connected to a shaft extending from the mirror 4 and to the holding plate 34 and having a biasing force in a shrinking direction.

Under such a construction, the actuating portion 32a of the linear actuator 32 expands and contracts, whereby a force is directly imparted to the mirror 4, which is thus rotated about the D axis. Also, the actuating portion 31a of the linear actuator 31 expands and contracts, whereby a force is imparted to the holding plate 34 and thus, the holding plate 34 and the mirror 4 are rotated about the C axis.

The control as described above is continuously effected during communication and the self posture correction in which the transmission light from the partner side is received always by the center of the light receiving element is effected by each of the two-way optical communication apparatuses facing each other with a space interposed therebetween, whereby the vicinity of the center of the strength distribution of each transmission beam coincides with the beam introducing port of the partner side.

Figure 9:
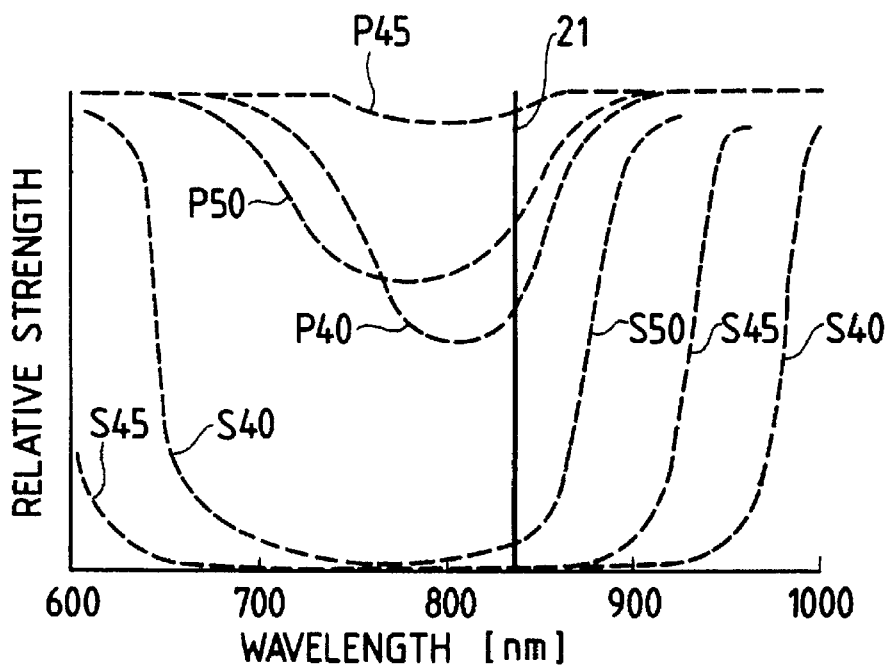
FIG. 9 is a graph showing the characteristic of dependence of the spectral transmittance of a polarizing beam splitter in the first embodiment on the angle of incidence of light.

It is FIG. 9 that shows the general characteristic of dependency of the spectral transmittance of the polarizing beam splitter 3 used in the present embodiment on the angle of incidence of light. The transmittances of S-polarized component for the angles of incidence, 40°, 45° and 50° onto the cemented surface of the beam splitter 3 are indicated by curves S40, S45 and S50, respectively, and the transmittances of P-polarized component are indicated by curves P40, P45 and P50, respectively, and the oscillation wavelength of the laser diode of a wavelength 830 nm is shown at 21. When the polarizing beam splitter having the characteristic as shown in FIG. 9 is used in the apparatus of the present embodiment, if light enters deviating from the reference angle of incidence 45°, the variation in the transmittance characteristic of P-polarized component is remarkable, and this leads to the loss of transmission efficiency or reception efficiency. Accordingly, it is desirable that the light beam entering the polarizing beam splitter be a substantially parallel light beam uniformized to the reference angle of incidence 45°.

It is also desirable that in order to increase the quantity of received light, a beam expander be provided forwardly of the reflecting mirror 4.

Figure 7:
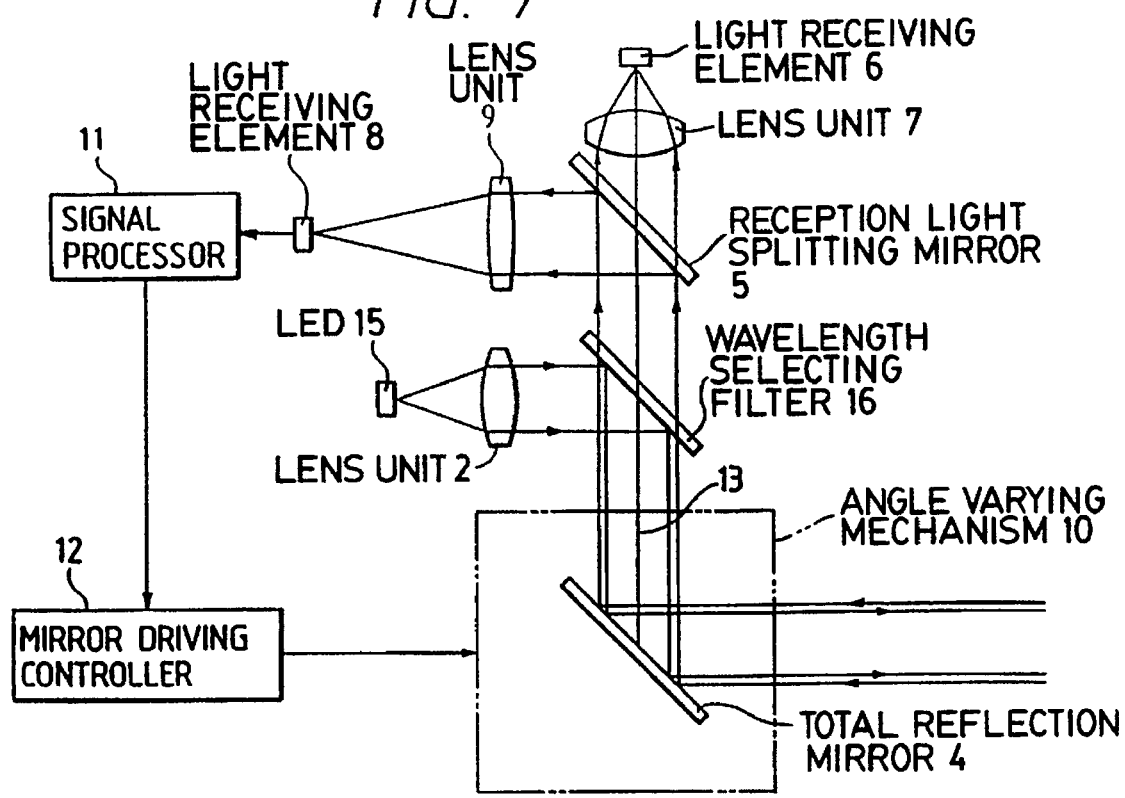
FIG. 7 is a schematic view of a second embodiment of the optical communication apparatus according to the present invention.

FIG. 7 is a schematic view illustrating a second embodiment of the present invention. The difference of the second embodiment from the first embodiment is that instead of the laser diode 1, a light emitting diode 15 is used as the light emitting element and a wavelength selecting filter 16 is used in lieu of the polarizing beam splitter 3. As the light signal detecting light receiving element 6, a pin photodiode may be used in lieu of the avalanche photodiode.

Figure 8:
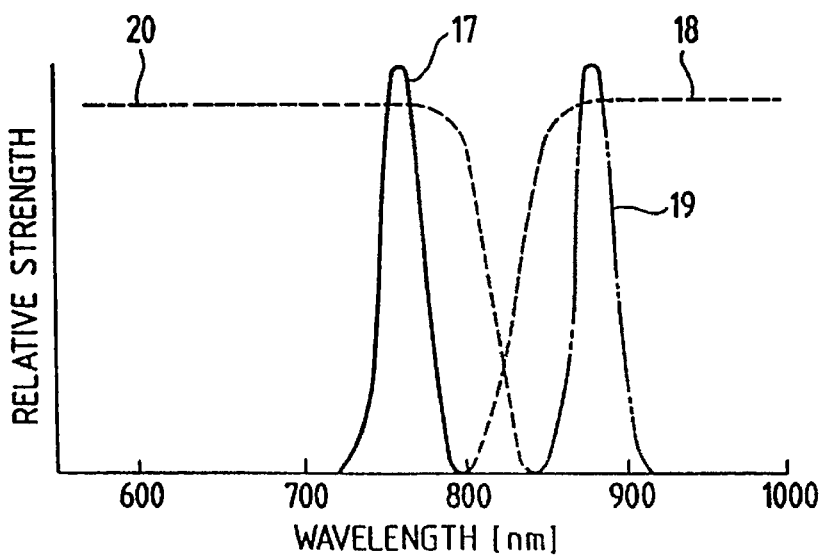
FIG. 8 is a graph showing the light emission strength distribution of a light emitting diode and the spectral transmittance of a wavelength selecting filter in the second embodiment.

The light emission strength of the light emitting diode 15 and the spectral transmittance of the wavelength selecting filter 16 are in a relation as shown in FIG. 8. The light emitting diode of its own has a light emission peak in the vicinity of a wavelength 760 nm as indicated at 17, and the long wavelength side base of the distribution is in the vicinity of 800 nm. On the other hand, the light emitting diode of the partner side has a light emission peak in the vicinity of a wavelength 880 nm as indicated at 19, and the short wavelength side base of the distribution is in the vicinity of 850 nm. Here, if a wavelength selecting filter having a spectral characteristic as indicated at 18 in FIG. 8 is used as the wavelength selecting filter of its own, the emitted light beam of its own is almost reflected and is sent to the partner side via the mirror 4, and the reception beam from the partner side introduced via the mirror 4 is almost transmitted and arrives at the light receiving elements 6 and 8. If a wavelength selecting filter having a spectral characteristic as indicated at 20 in FIG. 8 is used on the partner side as well, a similar effect will be obtained. In the other points, the second embodiment is functionally similar to the first embodiment.

In the present embodiment, if a light emitting diode is used as the light emitting element and a pin photodiode is used as the light signal detecting light receiving element, the transmission capacity will become small as compared with the first embodiment, but the electric circuit can be simplified and thus, a more inexpensive apparatus can be provided.

Figure 10:
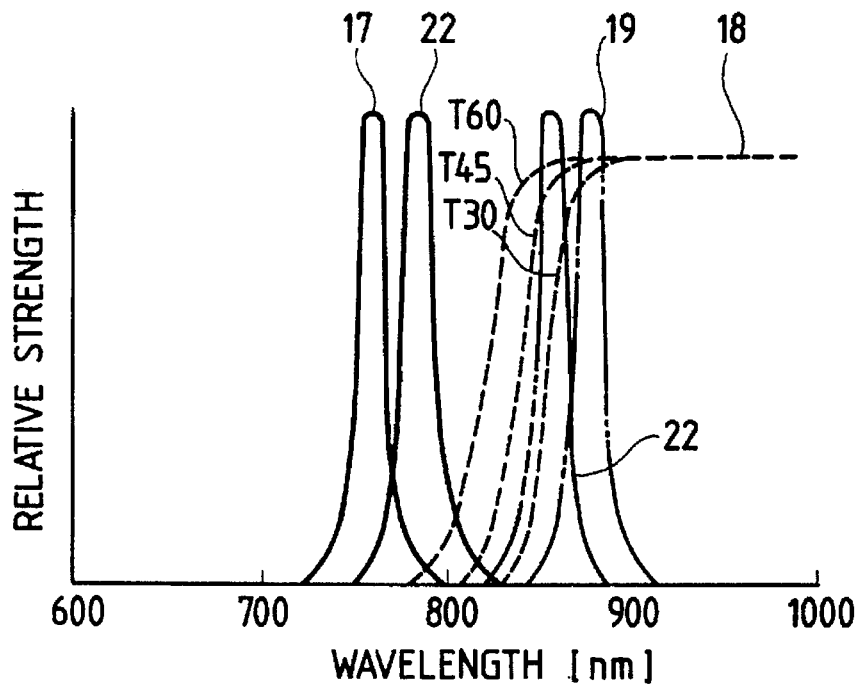
FIG. 10 is a graph showing the characteristic of dependence of the spectral transmittance of a wavelength selecting filter used in the second embodiment of the present invention on the angle of incidence of light.

It is FIG. 10 that shows the general characteristic of dependency of the spectral transmittance of the wavelength selecting filter 16 used in the present embodiment on the angle of incidence of light. The spectral transmittances of the wavelength selecting filter of its own for the angles of incidence 30°, 45° and 60° are indicated by curves T30, T45 and T60, respectively. The second embodiment is not so sensitive in the dependency on angle as the first embodiment, but yet taking into account the irregularity of the main wavelength of the emitted light of the light emitting element from product to product, the light emission strengths and distribution curves of the both sides are considerably approximate to each other and therefore, to accomplish efficient transmission and reception, it is desirable that the light beam entering the wavelength selecting filter be a substantially parallel light beam uniformized to the reference angle of incidence 45°.

Also, it is desirable that a beam expander be used forwardly of the total reflection mirror 4 to increase the quantity of received light and transmission and reception be effected by a lens portion of great aperture.

Figure 11:
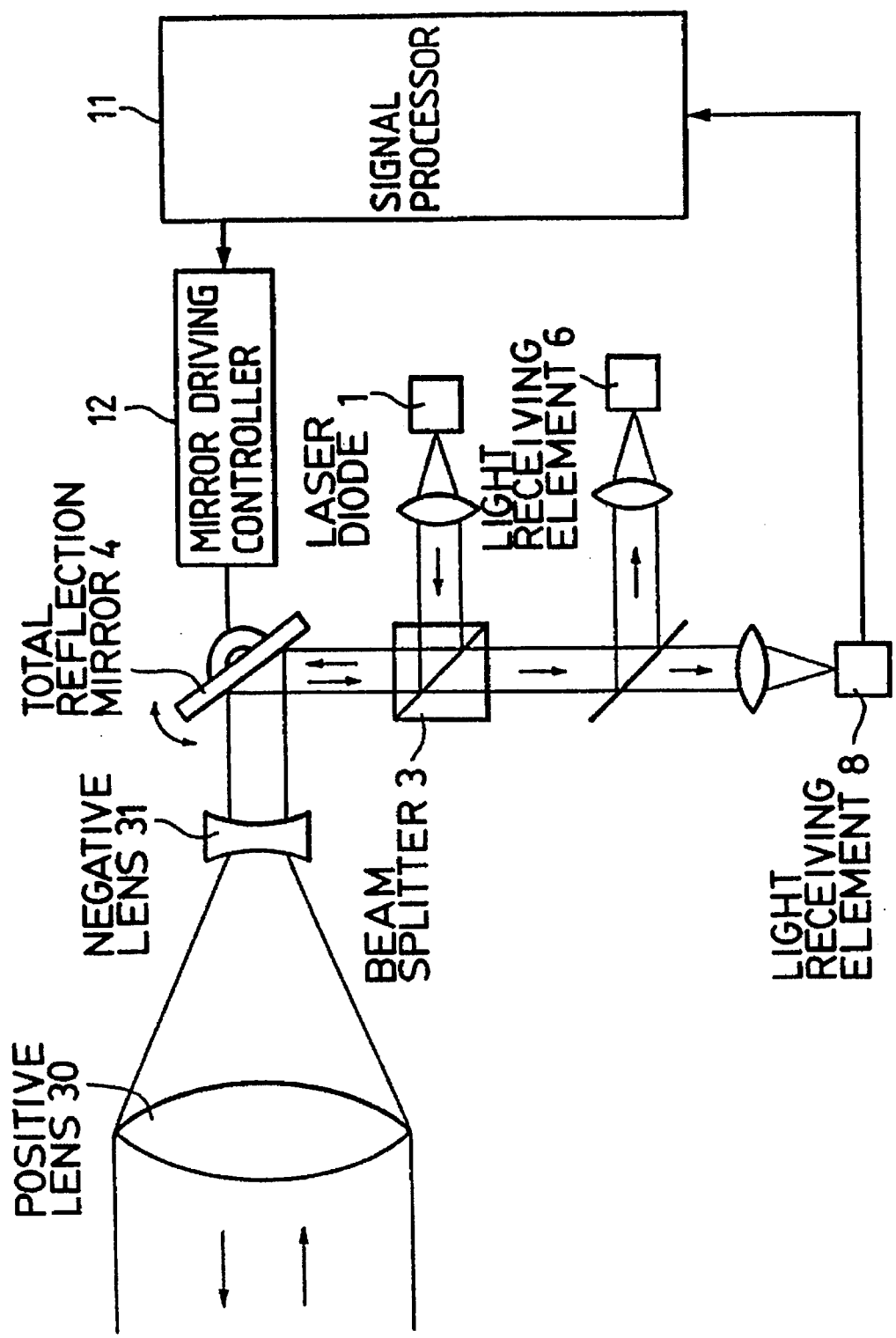
FIG. 11 is a schematic view of a third embodiment of the optical communication apparatus according to the present invention.
Figure 12:
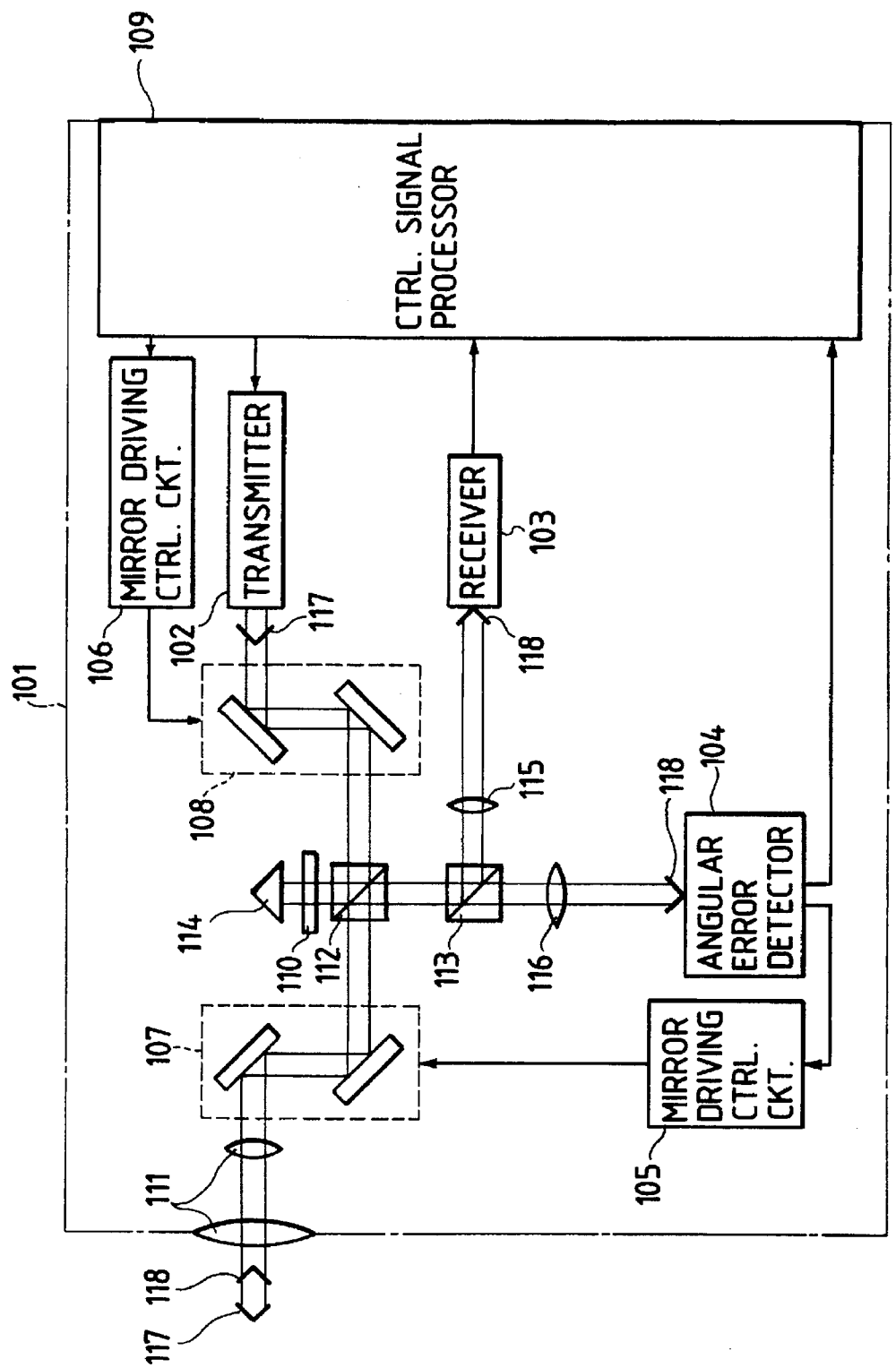
FIG. 12 is a schematic diagram of a two-way spatial optical communication apparatus provided with an angular deviation correcting mechanism according to the prior art.

FIG. 11 shows an embodiment of it. In this embodiment, a beam expander comprising a positive lens 30 and a negative lens 31 is disposed forwardly of the reflecting mirror 4. In the present embodiment, the locations of the light signal detecting light receiving element 6 and the position detecting light receiving element 8 in the previous embodiment are changed.

As described above, according to the present embodiment, in a two-way spatial optical communication apparatus having a light emitting element, a light receiving element and a beam splitter, a reception light splitting mirror is provided at a location of approximately 45° with respect to the optical axis between the beam splitter and the light receiving element, and one of the lights is splitted to the light signal detecting light receiving element and the other light is splitted to the position detecting light receiving element, and these lights are condensed through lens units each having positive power. Further, on the transmission light emergence side of the beam splitter, at an angle of approximately 45° with respect to the optical axis, there is provided a total reflection mirror provided with a mirror angle varying mechanism rotatable about two axes, and a signal processor for sending a mirror driving signal to a mirror driving controller on the basis of the positional deviation information of the received beam spot dejected by the position detecting light receiving element, whereby even if the apparatus shakes, the reception light can always be introduced near the center of the reception beam strength distribution and highly reliable two-way communication of less breakage decrease can be accomplished.

As described above, according to the present invention, the mirror driven for the correction of optical axis deviation is single and therefore, as compared with the prior art, a wide space is not required and the compactness and light weight of the apparatus become possible. Further, the range of optical axis deviation correction angle can be secured more widely than in the prior-art system using a set of two mirrors and therefore, the beam can be widened in advance as far as the central strength of the transmission beam permits, and by using the transmission light while widening the directional angle thereof, the range of optical axis deviation correction can be more widened. Accordingly, a more reliable two-way spatial optical communication apparatus can be realized.

The above-described embodiments have been shown with respect to an example in which when communication is being effected, the reflecting mirror 4 is driven to perform the pursuing operation so that two-way communication can be performed in a good state. Description will hereinafter be made of an embodiment in which when communication is not being effected, the mirror is brought to a desired angular position by an operating signal.

Figure 16:
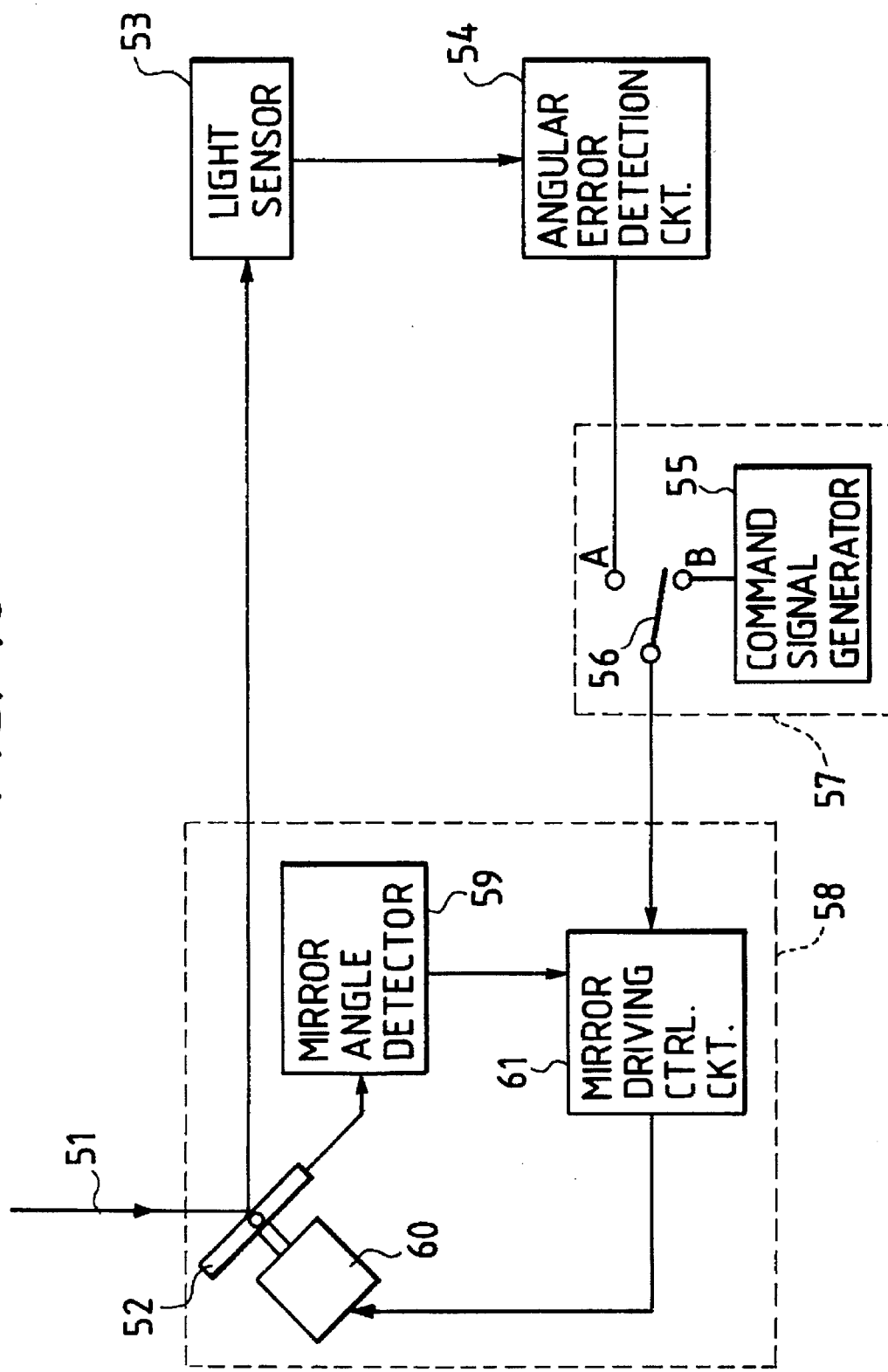
FIG. 16 is a block diagram of a light beam automatic pursuing apparatus embodying the present invention.

FIG. 16 is a diagram showing best the features of a light beam automatic pursuing device in the optical signal receiving apparatus of the present invention. In FIG. 16, the reference numeral 51 designates reception light, the reference numeral 52 denotes a tracking mirror corresponding to the aforedescribed mirror 4, the reference numeral 53 designates a light sensor corresponding to the aforedescribed element 8 and converting the reception light 51 into an electrical signal, the reference numeral 54 denotes a pursuit angular error detection circuit for processing the signal from the light sensor and estimating a pursuit angular error and corresponding to the aforedescribed processor 11 and controller 12, the reference numeral 55 designates a command signal generator for generating a command angle to the tracking mirror 52, the reference numeral 56 denotes a switch for changing over the signal from the pursuit angular error detection circuit 54 and the signal from the command signal generator 55, the reference numeral 57 designates a control circuit for controlling the command signal generator 55 and the switch 56, the reference numeral 58 denotes a light beam angle adjuster for controlling the angle of the tracking mirror 52 and adjusting the angle of the reception light 51, the reference numeral 59 designates a mirror angle detector for detecting the angle of the tracking mirror 52, the reference numeral 60 denotes the aforedescribed actuator for driving the tracking mirror 52, and the reference numeral 61 designates a mirror driving control circuit for comparing the input to the light beam angle adjuster 58 with the mirror position signal from the mirror angle detector 59 and controlling the actuator 60.

During the automatic pursuit of the light beam, as in the previous embodiment, the reception light 51 is reflected by the tracking mirror 52 and enters the light sensor 53, and the error between the spot center of the reception light on the light sensor 53 and the center of the light sensor 53 is detected by the pursuit angular error detection circuit 54. At this time, the switch 56 in the control circuit 57 is connected to A side and therefore, the detected angular error signal is fed back to the light beam angle adjuster 58. The light beam angle adjuster 58 controls the angle of the tracking mirror 52 so that the reception light 51 may enter the center of the light sensor 53.

On the other hand, when program control is to be effected, for example, when the mirror is to be returned to its initial position or to be driven to a desired position, the switch 56 is connected to B side, whereby the command signal from the command signal generator 55 is input to the light beam angle adjuster 58, which thus varies the angle of the tracking mirror 52 in accordance with that signal. Both during automatic pursuit control and during program control, the angle of the tracking mirror 52 is detected by the mirror angle detector 59 and is fed back to the actuator 60 through the mirror driving control circuit 61. That is, a feedback control system for the angle of the tracking mirror 52 is constituted within the light beam angle adjuster 58.

In the light beam automatic pursuing device in the optical signal receiving apparatus of the present invention constructed as described above, when the reception light 51 is intercepted during automatic pursuit, the automatic pursuit is interrupted by the control circuit 57 and is changed over to the program control by the command signal, whereby it becomes possible to avoid the angle of the tracking mirror 52 falling into an uncontrollable state and set the tracking mirror exactly at a desired angle. As a result, automatic capture can be effected in accordance with a preset sequence, and the angle of the tracking mirror 52 can be maintained at the angle immediately before the interception of the reception light until the reception light returns.

As described above, in the light beam automatic pursuit device in the optical signal receiving apparatus of the present invention, a feedback control system using a tracking mirror angle detector is provided within the light beam angle adjuster, and automatic pursuit and program control are changed over, whereby the angle of the tracking mirror can be arbitrarily controlled even when automatic pursuit is not being effected.

Description will now be made of an embodiment in which the beam diameter of light is changed and which is compact and yet efficiently transmits the light to the partner side.

Figures 17, 18:
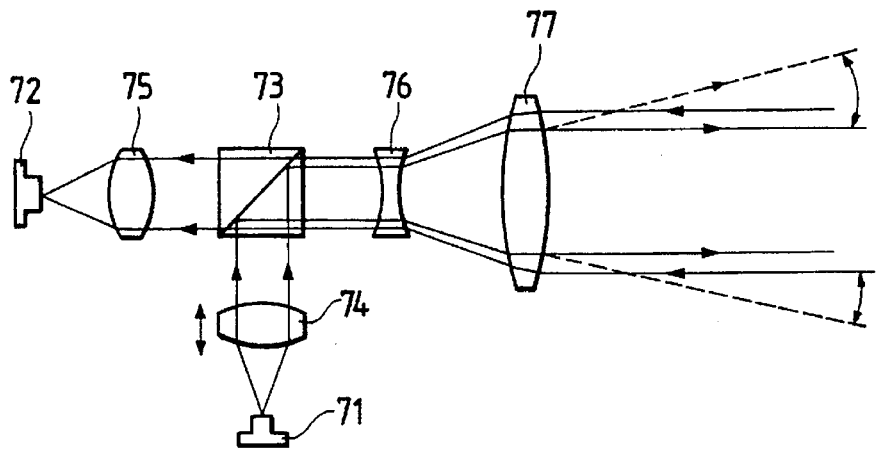
FIG. 17 is a schematic view showing an embodiment of the present invention.
FIG. 18 is a table showing the main numerical data of optic systems used in the FIG. 17 embodiment of the present invention.
Figure 19:
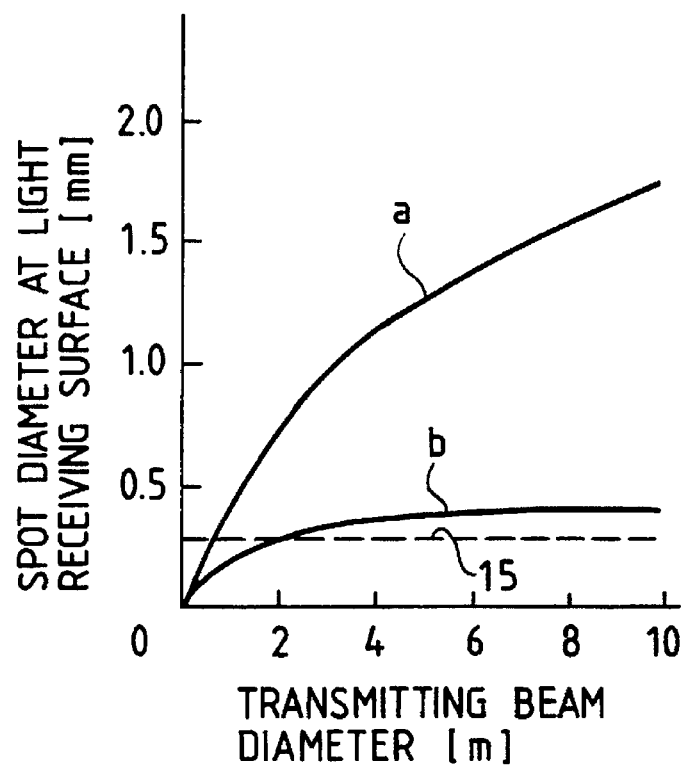
FIG. 19 is a graph showing the variation in the spot diameter at the light receiving surface during the variation in the transmission beam diameter in the optic system used in the FIG. 18 embodiment of the present invention.
Figure 20:
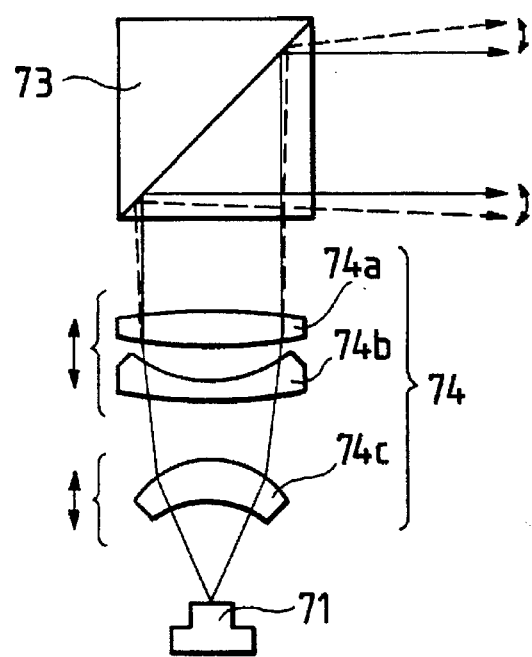
FIG. 20 shows an example in which a lens unit having positive power is comprised of three lenses.

FIG. 17 is a schematic view showing such an embodiment of the present invention. This embodiment is comprised of a laser diode 71 as a light emitting element generating light modulated by an information signal, an APD (avalanche photodiode) 72 as a light receiving element, a positive lens unit 75 for condensing the light beam of the partner side, a polarizing beam splitter 73 as a beam splitter, a positive lens unit 74 for making the light of the light emitting element into a beam-like shape, and a beam expander comprising a lens unit 76 having negative power and a lens unit 77 having positive power. Apparatuses of similar structure are opposed between two points with a space interposed therebetween to thereby effect two-way optical communication. In such apparatus, the lens unit 74 having positive power is made movable in the direction of the optical axis, whereby the directional angle of transmission light, i.e., the diameter of the transmission beam, is made changeable. With regard to the transmission beam diameter varying system by the lens unit 77 having positive power being moved by the use of optic systems of the conditions as shown in FIG. 18 and the transmission beam diameter varying system by the lens unit 74 having positive power being moved by the use of optic systems of the conditions as shown in FIG. 18, curves representative of variations in the spot diameter on the light receiving element when the range in which the strength of the transmission beam (elliptical shape) from the partner at each reception point when used in a transmission distance of 20 m in the direction of the minor diameter thereof is the transmission beam diameter are indicated by a and b in FIG. 19. The transmission beam varying system according to the present invention using the lens unit 74 having positive power which is indicated by the curve b is much smaller in the variation in the spot diameter on the light receiving element. This is a difference occurring from whether the optic system concerned in even the light receiving side is moved to vary the transmission beam diameter.

The present embodiment, in view of such a problem, provides an optical communication apparatus which can vary the directional angle of the transmission beam accurately and without affecting the reception beam.

Figure 22:
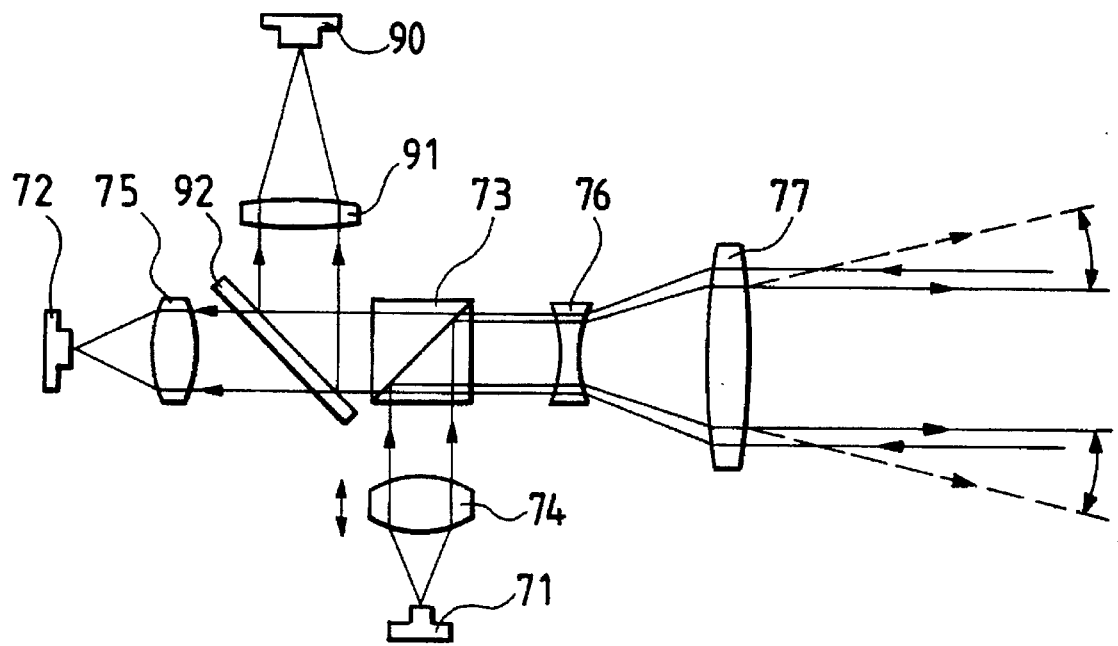
FIG. 22 is a schematic view showing another embodiment of the present invention.

The embodiment of FIG. 17 is one in which the whole of the lens unit 74 having positive power is moved along the optical axis, but as shown in FIG. 22, the lens unit 74 may be comprised of a plurality of lenses, and only a lens 74c or two lenses 74b and 74a may be moved as a unit along the optical axis to thereby obtain a similar effect.

Figure 21:
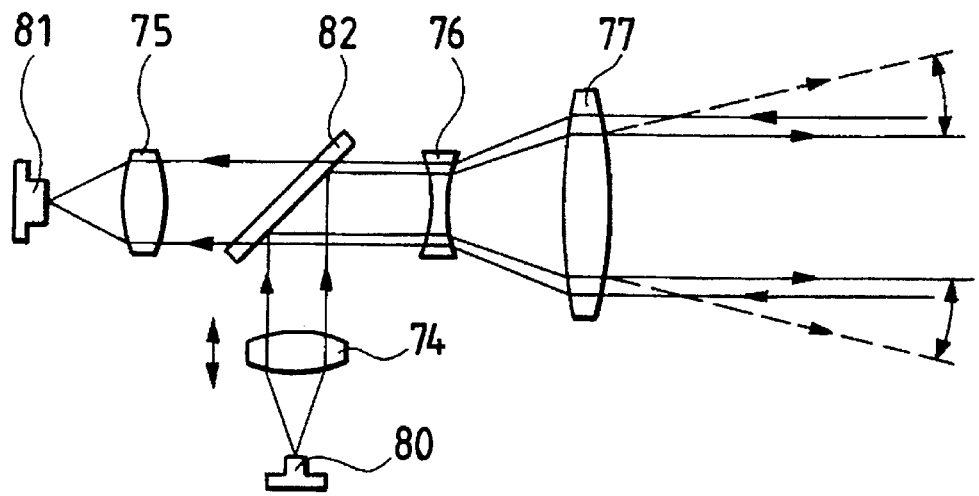
FIG. 21 shows an example of the application of the embodiment shown in FIG. 17.

Also, as shown in FIG. 21, instead of the light emitting and receiving elements used in the present embodiment, a light emitting diode 80 and a pin photodiode 81 may be used as the light emitting element and the light receiving element, respectively, and in this case, the transmission beam varying system of the present embodiment may be used in a two-way spatial optical communication apparatus using a wavelength selecting filter 82 as the beam splitter. If such a construction is adopted, two-way optical communication can be realized by a more inexpensive apparatus when small capacity communication is to be effected in a short distance.

Figure 26:
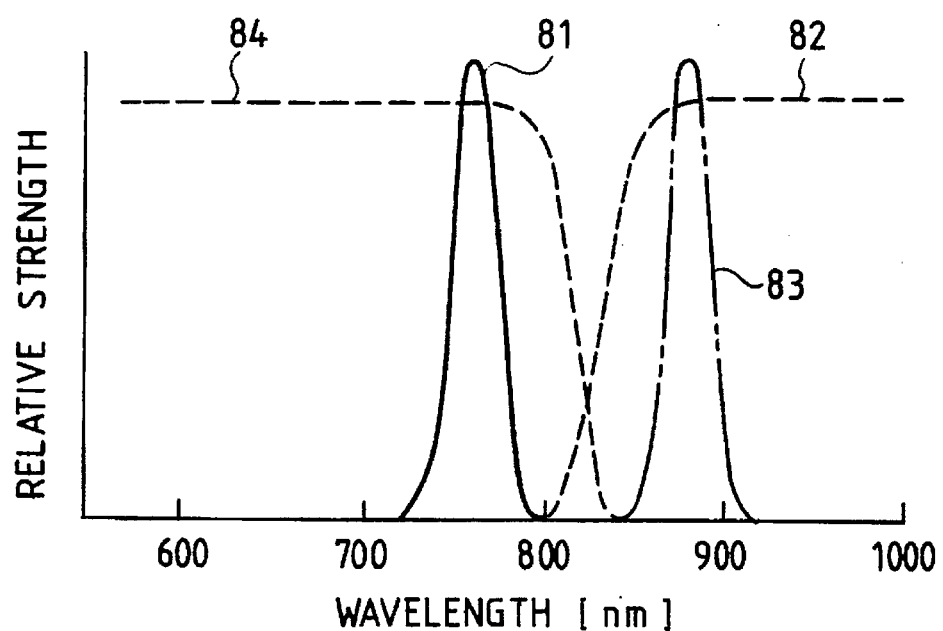
FIG. 26 is a graph showing the spectral transmittance characteristic of a wavelength selecting filter.

For information, the light emission strength of the light emitting diode 80 and the spectral transmittance of the wavelength selecting filter 82 in this case are shown in FIG. 26. The light emitting diode of its own has a light emission peak in the vicinity of a wavelength 760 nm as indicated at 81, and the long wavelength side base of the distribution is in the vicinity of 800 nm. On the other hand, the light emitting diode of the partner side has a light emission peak in the vicinity of a wavelength 880 nm as indicated at 83, and the short wavelength side base of the distribution is in the vicinity of 850 nm. If here, a wavelength selecting filter having a spectral characteristic as indicated by 82 in FIG. 26 is used as the wavelength selecting filter of its own, the emitted light beam of its own is almost reflected and sent to the partner side, while the reception beam from the partner side is almost transmitted and arrives at the light receiving element 81. If a wavelength selecting filter having a spectral characteristic as indicated by 84 in FIG. 26 is used on the partner side as well, a similar effect will be obtained. In the other points, the present embodiment is functionally similar to the previous embodiment.

In the present embodiment, if a light emitting diode is used as the light emitting element and a pin photodiode is used as the light signal detecting light receiving element, the transmission capacity will become small as compared with the previous embodiment, but the electric circuit can be simplified and therefore, a more inexpensive apparatus can be provided.

In the above-described embodiment, a combination of the lens unit 76 having negative power and the lens unit 77 having positive power is used as the arrangement of the optic systems functioning as a beam expander, and as a method of providing a similar function, there is a method of constructing the beam expander of lens units both having positive power, but the former method is more advantageous in respect of the compactness and light weight of the apparatus.

FIG. 22 is a schematic view of a further embodiment of the present invention. This figure shows an example of the optic system used when a position detecting light receiving element 90 is newly added to the apparatus of the FIG. 17 embodiment to thereby endow the apparatus with the function of correcting the optical axis deviation of the reception light when the apparatus shakes.

Figure 23:
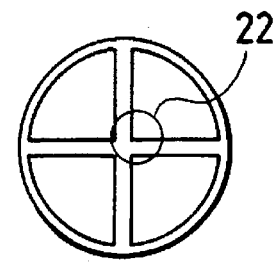
FIG. 23 shows the light receiving surface of a four-division sensor used as a position detecting light receiving element in FIG. 24.
Figure 24:
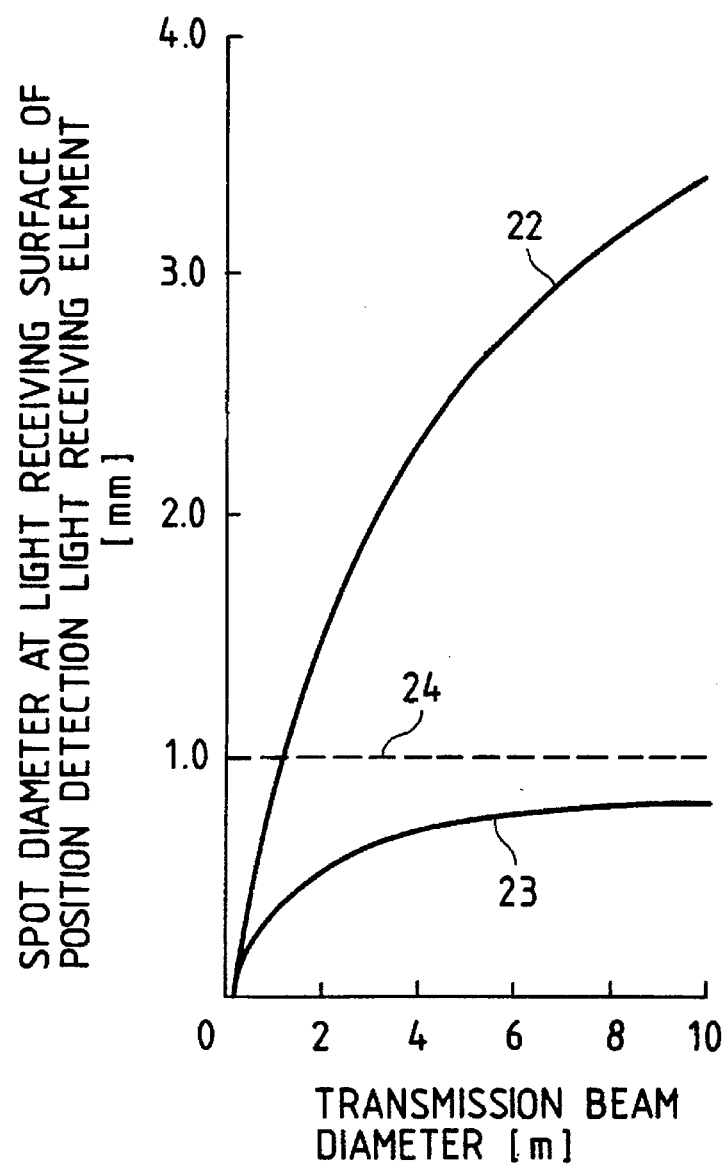
FIG. 24 is a graph showing a variation in the spot diameter at the light receiving surface during the variation in the transmission beam diameter in the optical diameter used in the FIG. 23 embodiment of the present invention.
Figure 25:
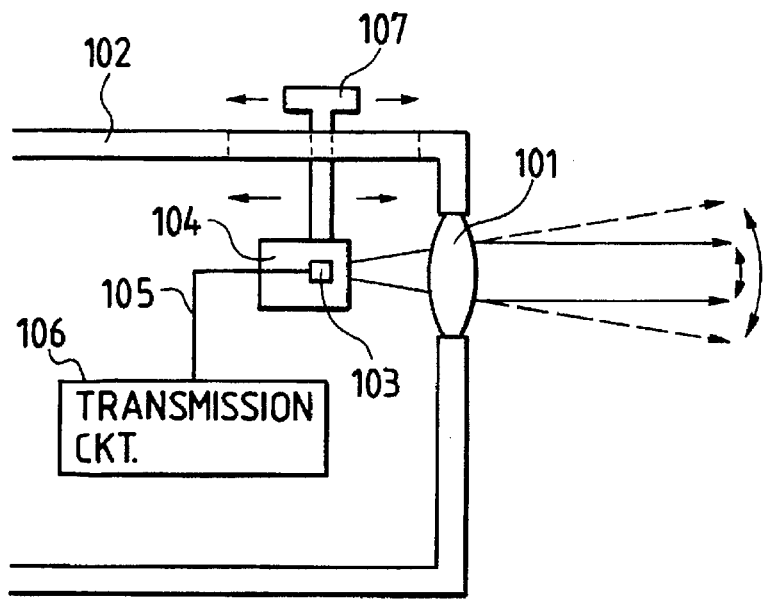
FIG. 25 is a schematic view of an example of the prior art.

A four-division sensor is used as the position detecting light receiving element 90 as previously described, a reception light forking mirror 92 is disposed on the light receiving side at an angle of 45° with respect to the optical axis, and part of the reception light is directed onto the position detecting light receiving element with a certain spot diameter through a lens unit 91 having positive power. FIG. 23 shows a case where for example, a half mirror of 90% transmission and 10% reflection is used. During the designing of the apparatus, the apparatus is adjusted so that the reception beam spot may lie at the center of the four-division sensor as shown in FIG. 23, whereafter when the position of the reception beam spot deviates in an unattended state due to unexpected shake or the like of the apparatus, this deviation information is converted into a signal and the entire apparatus is rotated in two different directions, whereby the beam spot is controlled so as to lie at the center of the four-division sensor. Of course, it is desirable that the entire apparatus be not moved but the reflecting mirror 4 be added as shown in FIG. 1 and this mirror be moved. Where use is made of a position detecting light receiving element such as a four-division sensor, any variation in the size of the beam spot diameter on the light receiving element greatly affects the accuracy of positional deviation detection. When in the present embodiment, the focal length of the lens unit 91 having positive power is 50 mm and the same optical diameter as that in the previous embodiment is used for the other lens unit, the diameters of the forked light beams by the reception light forking mirror 92 are equal to each other and therefore, the amount of variation in the spot diameter on the light receiving side by the movement of the lens unit 74 having positive power in the direction of the optical axis is proportional to the focal lengths of the lens units 74 and 91 having positive power, and is as shown in FIG. 25. To increase the sensitivity of the position detecting side, it is desirable that the focal length of the lens unit 91 having positive power be as great as possible. It means the impossibility of position detection that on the position detecting side, the reception light spot diameter exceeds the effective light receiving diameter $\phi$/mm of the light receiving element. Accordingly, as shown in FIG. 25, the transmission beam diameter varying system according to the present invention can operate the optical axis deviation correcting instrument like the present embodiment even when the transmission distance is short (20 m).

As described above, in a two-way optical communication apparatus having a light emitting element, a light receiving element, a beam splitter and a beam expander, each of said light emitting element and said light receiving element having a lens unit having positive power between it and said beam splitter, the whole or part of said lens unit having positive power disposed between said light emitting element and said beam splitter is made movable along the optical axis, whereby the transmission beam diameter is made variable. This leads to the effect that the communicable distance range to the short distance side can be widened. Particularly where the apparatus uses a position detecting light receiving element such as a four-division sensor and is provided with an optical axis deviation correcting mechanism, the function thereof can be displayed more effectively than in the transmission beam diameter varying system according to the prior art.

What is claimed is:

1. A two-way optical communication apparatus comprising:

at least one pair of optical transmitter-receivers, each of said optical transmitter-receivers including:

generating means for generating transmission light;

receiving means for receiving reception light;

optical means for reflecting one of the transmission light and the reception light and for transmitting the other therethrough, said optical means being a polarizing beam splitter;

reflecting means for reflecting the transmission light emerging from said optical means to the transmission side and reflecting the reception light to said optical means;

driving means for rotating said reflecting means about two axes;

a lens unit having positive refractive power between said polarization beam splitter and said generating means; and driving means for driving at least a portion of said lens unit along its optical axis.

2. An optical communication apparatus according to claim 1, further including light splitting means for splitting part of the reception light obtained from said optical means, and detecting means for detecting the position of the light obtained from said light splitting means, and wherein said reflecting means is driven on the basis of the detection signal of said detecting means.

3. An optical communication apparatus according to claim 1, wherein said generating means is a laser source.

4. An optical communication apparatus according to claim 2, wherein said detecting means has an area sensor divided into four.

5. A transmitter-receiver including light emitting means for emitting transmission light modulated by an information signal, light receiving means for receiving reception light modulated by an information signal, an optical member for transmitting one of said transmission light and said reception light therethrough and reflecting the other, a beam expander disposed on the optical path of the transmission light obtained from said optical member, a lens unit disposed between said optical member and said light emitting means and having positive refractive power as a whole and making the light of said light emitting means into a beam-like shape, and driving means for driving a part or the whole of said lens unit along the optical axis thereof.

6. An apparatus according to claim 5, wherein said optical member is a polarization beam splitter.

\* \* \* \* \*

UNITED STATES PATENT AND TRADEMARK OFFICE
CERTIFICATE OF CORRECTION

PATENT NO. : 5,627,669

DATED : May 6, 1997

INVENTOR(S) : Orino et al.

It is certified that error appears in the above-indentified patent and that said Letters Patent is hereby corrected as shown below:

On title page, item
[56] FOREIGN PATENT DOCUMENTS:

"1226228 9/1989 Japan.
2186311 7/1990 Japan." should read
--1-226228 9/1989 Japan.
2-186311 7/1990 Japan.--.

COLUMN 1:

Line 54, "other" should read --another--.

COLUMN 2:

Line 14, "other" should read --another--.

COLUMN 8:

Line 16, "splitted" should read --split--;
Line 18, "splitted" should read --split--; and
Line 27, "dejected" should read --detected--.

UNITED STATES PATENT AND TRADEMARK OFFICE
CERTIFICATE OF CORRECTION

PATENT NO. : 5,627,669
DATED : May 6, 1997
INVENTOR(S) : Orino et al.

It is certified that error appears in the above-indentified patent and that said Letters Patent is hereby corrected as shown below:

COLUMN 13:

Line 5, "four." should read --four divisions.--

COLUMN 14:

Line 8, "An apparatus" should read --A transmitter-receiver--.

Signed and Sealed this

Second Day of December, 1997

Attest:

BRUCE LEHMAN

*Attesting Officer*     *Commissioner of Patents and Trademarks*